(12) United States Patent
Engelhart (10) Patent No.: US 11,985,517 B1
(45) Date of Patent: May 14, 2024

(54) WIRELESS COMMUNICATION NETWORK SERVICE USING NETWORK REPOSITORY FUNCTIONS (NRFS)

(71) Applicant: T-Mobile Innovations LLC, Overland Park, KS (US)

(72) Inventor: Robert Lee Engelhart, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 140 days.

(21) Appl. No.: 17/487,494

(22) Filed: Sep. 28, 2021

(51) Int. Cl.
*H04W 24/02* (2009.01)
*H04W 8/08* (2009.01)
*H04W 60/00* (2009.01)

(52) U.S. Cl.
CPC .............. *H04W 24/02* (2013.01); *H04W 8/08* (2013.01); *H04W 60/00* (2013.01)

(58) Field of Classification Search
CPC ....... H04W 24/02; H04W 8/08; H04W 60/00; H04W 88/06; H04W 8/12; H04W 48/16
See application file for complete search history.

(56) References Cited

U.S. PATENT DOCUMENTS

| | | | |
|---|---|---|---|
| 9,924,044 B2 | 3/2018 | Chen et al. | |
| 10,506,506 B2 | 12/2019 | Qiao et al. | |
| 10,616,934 B2 | 4/2020 | Talebi Fard et al. | |
| 10,673,618 B2 | 6/2020 | Suthar et al. | |
| 10,797,894 B2 | 10/2020 | Qiao et al. | |
| 10,999,447 B2 | 5/2021 | Qiao et al. | |
| 11,611,626 B1* | 3/2023 | Srivastava | H04L 41/122 |
| 11,671,369 B2* | 6/2023 | Rajput | H04L 67/51 370/235 |
| 11,716,252 B2* | 8/2023 | Rajput | H04L 67/30 370/220 |
| 11,864,093 B2* | 1/2024 | Srivastava | H04W 48/16 |
| 2020/0092424 A1 | 3/2020 | Qiao et al. | |
| 2021/0075915 A1 | 3/2021 | Qiao et al. | |
| 2022/0264432 A1* | 8/2022 | Reyes | H04W 76/11 |
| 2022/0295384 A1* | 9/2022 | Gupta | H04W 60/00 |
| 2023/0019209 A1* | 1/2023 | Rajput | H04L 43/10 |
| 2023/0057651 A1* | 2/2023 | Kuravangi-Thammaiah | H04W 60/00 |
| 2023/0070455 A1* | 3/2023 | Wang | H04L 67/562 |
| 2023/0090068 A1* | 3/2023 | Rajput | H04L 61/4511 370/254 |
| 2023/0188445 A1* | 6/2023 | Xin | H04W 24/02 709/224 |
| 2023/0254381 A1* | 8/2023 | Rodrigo | H04L 67/562 709/224 |
| 2023/0269608 A1* | 8/2023 | Puente Pestaña | H04W 24/10 370/252 |
| 2023/0397281 A1* | 12/2023 | Koshta | H04W 48/18 |

* cited by examiner

Primary Examiner — Khawar Iqbal (57) ABSTRACT

A wireless communication network serves wireless User Equipment (UEs) over producer Network Functions (NFs) and consumer NFs that use Network Repository Function (NRFs). The producer NFs determine their NF identities and status. The producer NFs indicate the NF identities and status to the NRFs. The consumer NFs request NF information from the NRFs. The NRFs indicate the NF identities and status to the consumer NFs. The consumer NFs select NF identities based on the NF status. The consumer NFs exchange network signaling with the producer NFs based on the selected NF identities to serve the wireless UEs. The producer NFs may comprise Charging Functions (CHFs).

21 Claims, 10 Drawing Sheets

WIRELESS COMMUNICATION NETWORK SERVICE USING NETWORK REPOSITORY FUNCTIONS (NRFS)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network functions that are often clustered together into wireless network cores. The wireless network functions comprise Charging Functions (CHFs), Session Management Functions (SMFs), Short Message Service Functions (SMSFs), Policy Control Functions (PCFs), Network Repository Functions (NRFs), and the like.

The NRFs help the other network functions to communicate with one another to serve the wireless user devices. When a consumer network function needs a producer network function of a given type to serve the wireless user devices, the consumer network function requests information for the network function type from the NRFs. The NRFs identify network functions of the requested type to the consumer network function. The consumer network function and the producer consumer network function then interact to serve the wireless user devices. Producer network functions register with the NRFs to allow consumer network functions to find and use them.

Unfortunately, the NRFs ineffectively help consumer network functions find optimal producer network functions. Moreover, the producer network functions do not efficiently use the NRFs to support other producer network functions that may need assistance.

Technical Overview

A wireless communication network serves wireless User Equipment (UEs) over producer Network Functions (NFs) and consumer NFs that use Network Repository Function (NRFs). The producer NFs determine their NF identities and status. The producer NFs indicate the NF identities and status to the NRFs. The consumer NFs request NF information from the NRFs. The NRFs indicate the NF identities and status to the consumer NFs. The consumer NFs select NF identities based on the NF status. The consumer NFs exchange network signaling with the producer NFs based on the selected NF identities to serve the wireless UEs. The producer NFs may comprise Charging Functions (CHFs).

DETAILED DESCRIPTION

Figure 1:
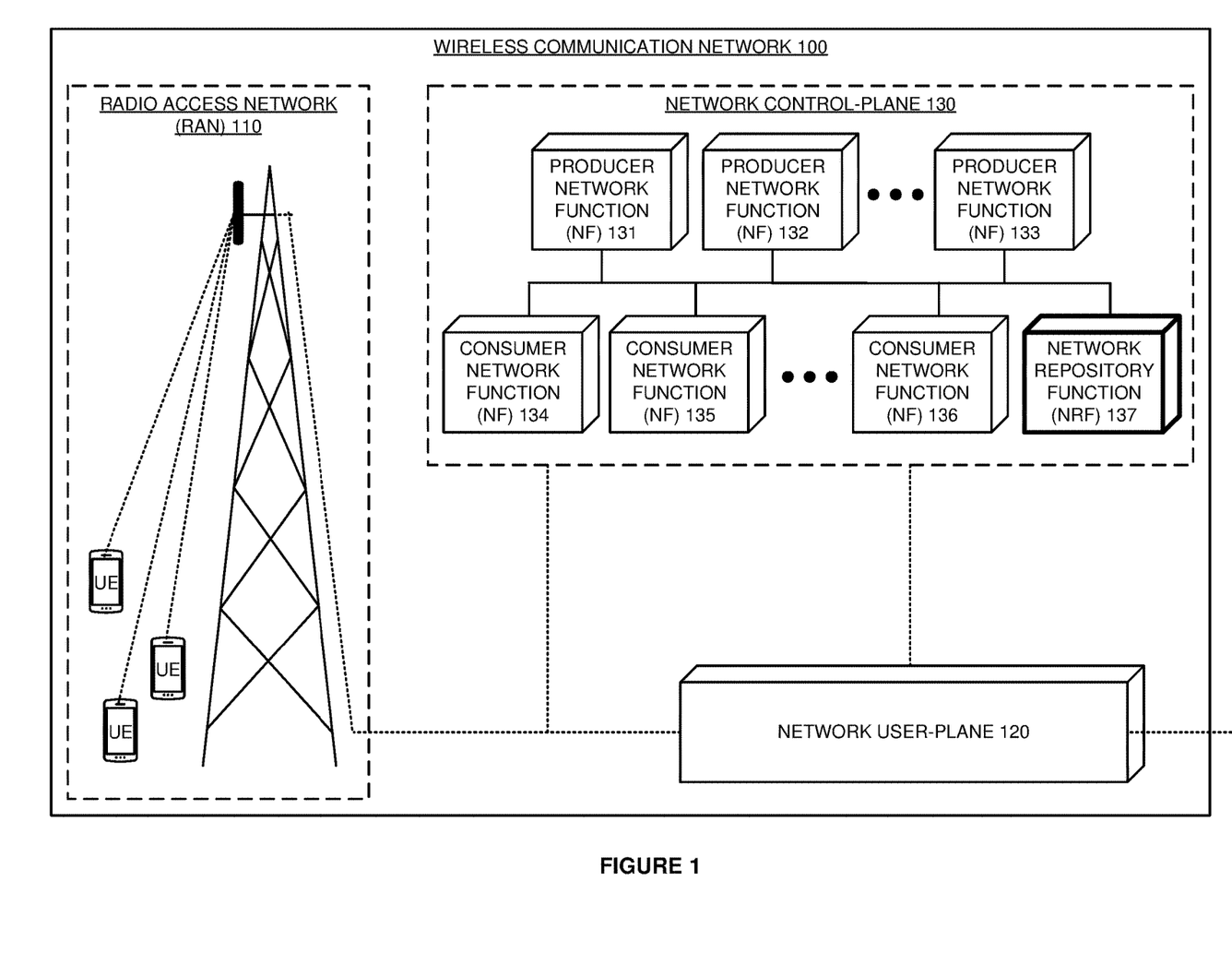
FIG. 1 illustrates an exemplary wireless communication network to serve wireless User Equipment (UEs) using a Network Repository Function (NRF).

FIG. 1 illustrates exemplary wireless communication network 100 to serve wireless User Equipment (UEs) using Network Repository Function (NRF) 137. Wireless communication network 100 comprises Radio Access Network (RAN) 110, network user-plane 120, and network control-plane 130. RAN 110 comprises the UEs and wireless access nodes. Network control-plane 130 comprises producer NFs 131-133, consumer NFs 134-136, and NEF 137. The UEs comprise computers, phones, vehicles, sensors, robots, or some other data appliance with communication circuitry. Exemplary wireless data services include machine-control, internet-access, media-streaming, social-networking, and/or some other networking product. Exemplary producer NFs 131-133 comprise Charging Functions (CHFs), Network Exposure Functions (NEFs), and/or some other NFs. Exemplary consumer NFs 134-136 comprise Session Management Functions (SMFs), Policy Control Functions (PCFs), Short Message Service Functions (SMSFs), and/or some other NFs. Wireless communication network 100 is simplified for clarity and typically includes far more UEs, access nodes, NFs, and NRFs than shown.

Various examples of network operation and configuration are described herein. In some examples, producer NFs 131-133 determine their NF identities and their NF status. The NF status may indicate network address, geographic location, current load, available capacity, service priorities, NF alarms, and the like. Producer NFs 131-133 indicate the NF identities and their NF status to NRF 137. Consumer NFs 134-136 request NF information from NRF 137—typically by NF type. NRF 137 receives the request and responsively indicates NF identities and NF status to consumer NFs 134-136. Individual consumer NFs 134-136 select individual NF identities based on the NF status. For example, consumer NF 134 may select the NF identity of producer NF 131 based on its proximate geographic location and its large available capacity. Consumer NFs 134-136 exchange network signaling with their selected producer NFs 131-133 based on the selected NF identities to serve the wireless UEs.

In some examples, producer NFs 131-133 determine new NF status and transfer their new NF status to the NRF 137. For example, producer NF 131 may report a new overload condition to NRF 137. NRF 137 indicates the new NF status to consumer NFs 131-133 responsive to their prior requests for NF information. Consumer NFs 131-133 may then select other producer NFs based on the new NF status.

In some examples, producer NFs 131-133 determine geographic locations for other producer NFs 131-133. Producer NFs 131-133 select other producer NFs 131-133 to support based on their geographic locations and register with NRF 137 to support their selected producer NFs. In response to the registration, NRF 137 indicates the NF identities and NF status for the supporting producer NF when its selected-supported producer NF is the NF response to an NF request. The consumer NF may use the supporting NF based on the status data.

In some examples, producer NFs 131-133 exchange test data with other producer NFs 131-133 to determine response latencies for the other producer NFs 131-133. Producer NFs 131-133 then select other individual producer NFs 131-133 to support based on their response latencies and register with NRF 137 to support their selected producer NFs 131-133. When NRF 137 selects a supported producer NF in response to an NF request, NRF 137 also responds with the NF identities and NF status for any supporting producer NFs that have registered to support the supported NF.

Advantageously, NRF 137 effectively helps consumer network functions 134-136 find optimal producer network functions 131-133. Moreover, producer network functions 131-133 efficiently use NRF 137 to support other producer network functions 131-133 that may need assistance.

The UEs and wireless access nodes in RAN 110 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. RAN 110, network-user-plane 120, network control plane 130, and external systems communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. The UEs and wireless access nodes include radios. The UEs, wireless access nodes, NFs 131-136, and NRF 137 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
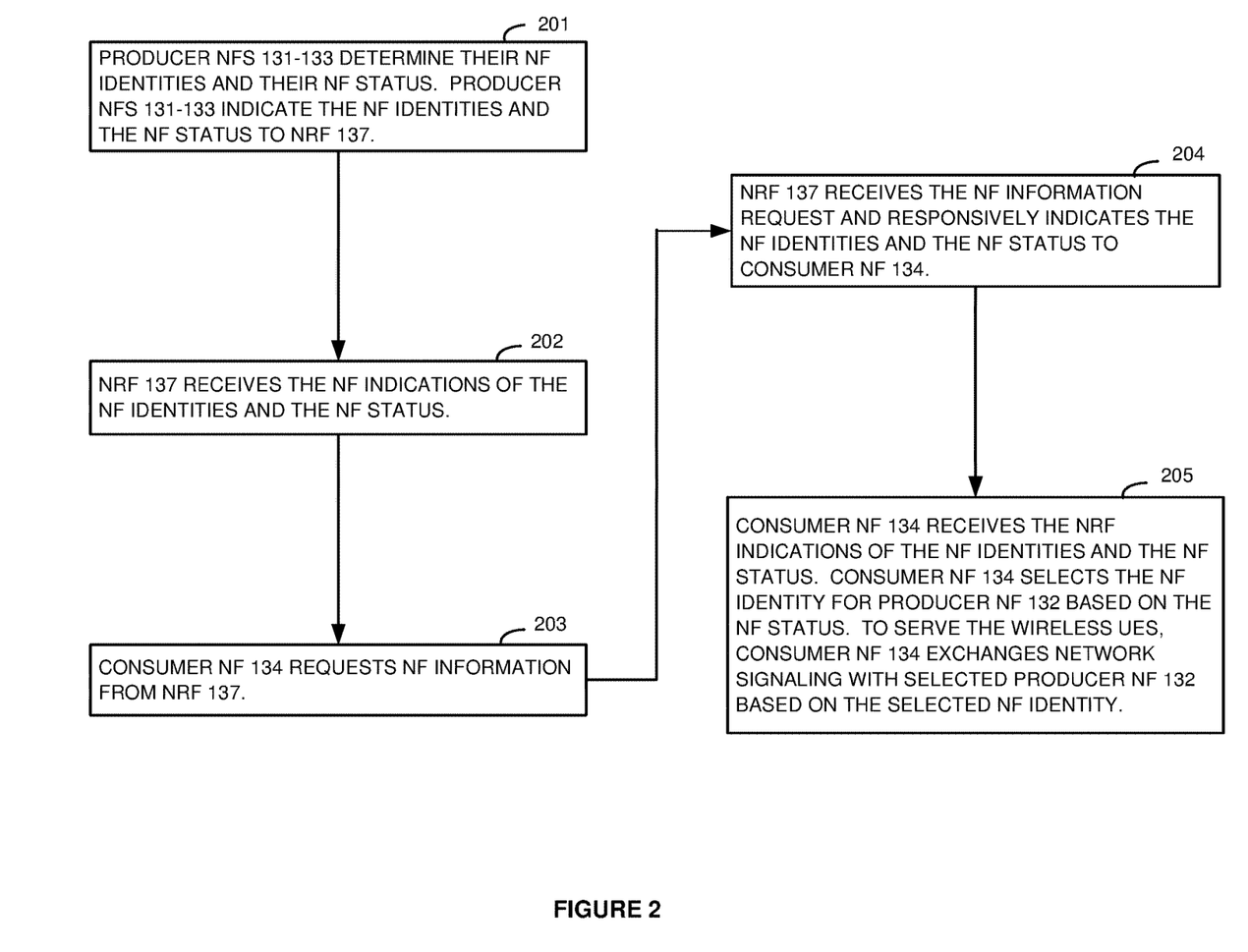
FIG. 2 illustrates an exemplary operation of the wireless communication network to serve the wireless UEs using the NRF.

FIG. 2 illustrates an exemplary operation of wireless communication network 100 to serve the wireless UEs using NRF 137. The operation may differ in other examples. Producer NFs 131-133 determine their NF identities and their NF status (201). Producer NFs 131-133 indicate the NF identities and the NF status to NRF 137 (202). Consumer NF 134 requests NF information from NRF 137—typically by NF type. NRF 137 receives the NF information request and responsively indicates the NF identities and the NF status to consumer NF 134. Consumer NF 134 receives the indications of the NF identities and the NF status (205). Consumer NF 134 selects the NF identity for producer NF 132 based on the NF status (205). To serve the wireless UEs, consumer NF 134 exchanges network signaling with selected producer NF 132 based on the selected NF identity (205).

Figure 3:
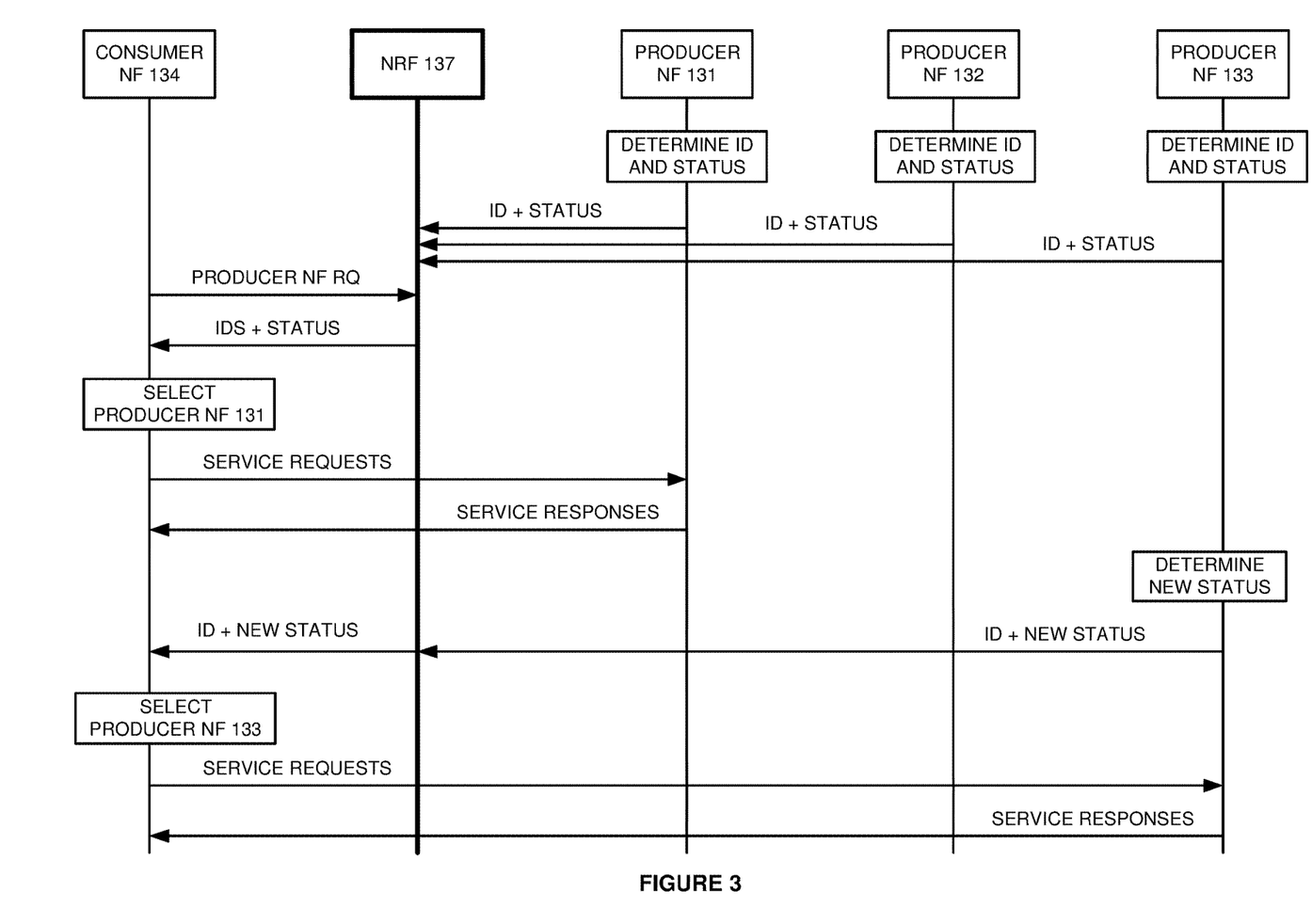
FIG. 3 illustrates an exemplary operation of the wireless communication network to serve the wireless UEs using the NRF.

FIG. 3 illustrates an exemplary operation of wireless communication network 100 to serve the wireless UEs using NRF 137. The operation may differ in other examples. Producer NFs 131-133 determine their NF identities and their NF status. Producer NFs 131-133 indicate their NF identities and NF status to NRF 137. Consumer NF 134 requests NF information from NRF 137 by NF type. NRF 137 receives the NF information request and responsively indicates the NF identities and the NF status for producer NFs 131-133 to consumer NF 134 based on NF type. Consumer NF 134 selects the NF identity for producer NF 131 based on NF status like proximate geographic location and available capacity. To serve the wireless UEs, consumer NF 134 signals service requests to producer NF 131 based on its selected NF identity, and producer NF 131 returns service responses. Producer NF 133 determines and transfers new NF status to NRF 137. NRF 137 indicates the new NF status to consumer NF 134 responsive to its prior NF request for the NF type. Consumer NF 134 selects a new NF identity for NF 133 based on the new NF status. To serve the wireless UEs, consumer NF 134 signals service requests to producer NF 133 based on the selected NF identity, and producer NF 133 returns service responses.

Figure 4:
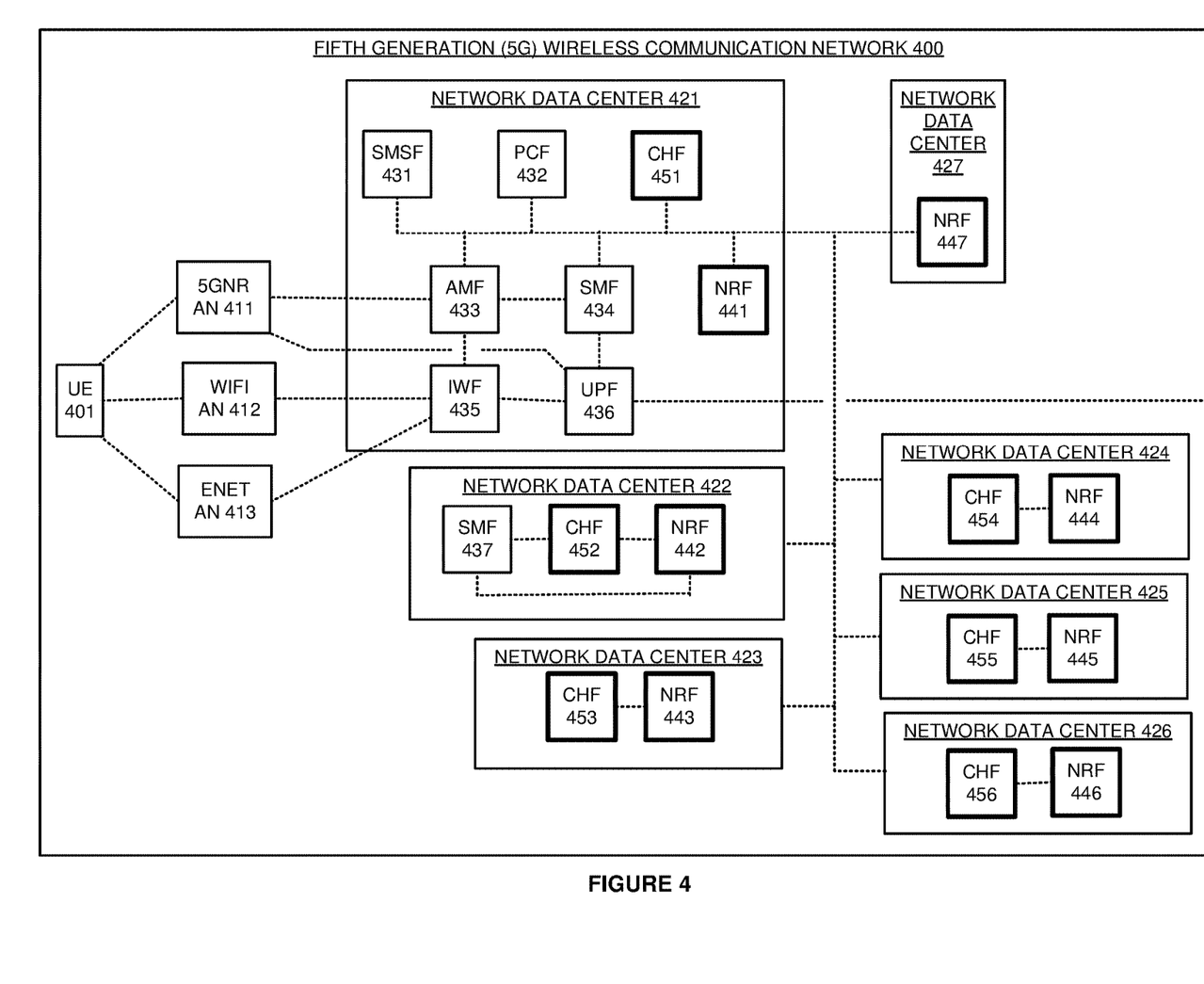
FIG. 4 illustrates an exemplary Fifth Generation (5G) wireless communication network to serve wireless UEs over Charging Functions (CHFs) that use Network Repository Functions (NRFs).

FIG. 4 illustrates exemplary Fifth Generation (5G) wireless communication network 400 to serve wireless UE 401 over CHFs 451-456 using NRFs 441-447. 5G wireless communication network 400 comprises an example of wireless communication network 100, although network 100 may differ. 5G wireless communication network 400 comprises: UE 401, Access Nodes (ANs) 411-413, and network data centers 421-427. In some cases, network data center 427 comprises a global/national data center while network data centers 421-426 comprise regional data centers. Network data center 421 comprises Short Message Service Function (SMSF) 431, Policy Control Function (PCF) 432, Access and Mobility Management Function (AMF) 433, Session Management Function (SMF) 434, Interworking Function (IWF) 435, User Plane Function (UPF) 436. Other network elements like Network Slice Selection Function (NSSF) and Unified Data Management (UDM) are typically present but are omitted for clarity. Network data centers 421-427 respectively comprise NRFs 441-447. Network data centers 421-426 respectively comprise CHFs 441-446. Network data center 423 also comprises SMF 437. Network data centers 422-426 are configured like network data center 421 but are simplified for clarity on FIG. 4. Wireless communication network 400 is also simplified for clarity and typically includes far more UEs, ANs, data centers, and network functions than shown. Individual NRFs like NRF 441 may represent NRF clusters that interact with other NFs like a single NRF entity. Individual CHFs like CHF 451 may represent a CHF cluster that interacts with other NFs like a single CHF entity.

CHFs 451-456 determine their CHF IDs and their CHF status. The CHF status comprises IP address, geographic location, current load, available capacity, service priorities, NF alarms, and the like. The geographic location cold be coordinates, data center name, network region, or some other location indicator. The current load could be expressed in percent of maximum load, and the available capacity could be expressed in unused percent of maximum capacity. The service priorities could indicate NF service priorities by NF type, network region, or some other factor. CHFs 451-456 indicate their CHF IDs and CHF status to respective local NRFs 441-446 in their own network data centers 421-426. NRFs 441-446 forward their CHF IDs and their CHF status to NRF 447. NRF 447 forwards the CHF IDs and CHF status to NRFs 441-446 so each of NRFs 441-447 has the CHF IDs and the CHF status for CHFs 451-456.

To provide CHF support, CHFs 451-456 request CHF information from their respective NRFs 441-446. NRFs 441-446 respond with the CHF IDs and CHF status for CHFs 451-456. CHFs 451-456 identify the geographic locations of other CHFs 451-456 and select other CHFs to support based on geographic proximity. For example, CHF 451 may only support other CHFs 452-456 that are within 500 miles. CHFs 451-456 register their individual support of other individual CHFs 451-456 with their respective NRFs 441-446. NRFs 441-446 forward the CHF support to NRF 447 which propagates the NRF support back to NRFs 441-446. For example, CHF 451 may register with NRF 441 to support CHF 452, so NRF 441 notifies NRF 447 that CHF 451 supports CHF 452, and NRF 447 notifies NRF 442 (and possibly NRFs 443-446) that CHF 451 supports CHF 452. When SMF 437 requests CHF information from NRF 442, NRF 442 returns the IDs and status data for both CHF 452 and CHF 451 based on the support. SMF 437 may opt to use CHF 451 to serve UE 401 based on the status data for CHFs 451-452.

To provide CHF support, CHFs 451-456 may exchange test data with one another based the IP addresses in the status data and determine response latency. CHFs 451-456 then select other CHFs to support based on their latency. For example, CHF 451 may only support other CHFs 452-456 that have a response latency that is less than 1 second. CHFs 451-456 register their individual support of other individual CHFs 451-456. Geographic data and response latency may be used in combination. For example, CHF 451 may select CHFs 452-454 as support candidates based on their geographic proximity and then select CHF 454 from the candidates to support, because CHF 454 has poor response latency and needs the help while CHFs 452-453 have good response latency and do not need help.

In data center 421, SMSF 431 requests CHF information from NRF 441. NRF 441 responds with the CHF IDs and status for local CHF 451 and any other CHFs 452-456 that have registered to support CHF 451. SMSF 431 selects one of CHFs 451-456 to support UE 401 based on the CHF IDs and status data. PCF 432 requests CHF information from NRF 441. NRF 441 responds with the CHF IDs and status for local CHF 451 and any other CHFs 452-456 that have registered to support CHF 451. PCF 432 selects one of CHFs 451-456 to support UE 401 based on the CHF IDs and status data. SMF 433 requests CHF information from NRF 441. NRF 441 responds with the CHF IDs and status for local CHF 451 and any other CHFs 452-456 that have registered to support CHF 451. SMF 433 selects one of CHFs 451-456 to support UE 401 based on the CHF IDs and status data. SMSF 431, PCF 432, and SMF 434 exchange network signaling with their selected CHFs 451-456 to serve wireless UE 401.

CHFs 451-456 determine new status data and transfer their new status data to their local NRFs 441-446. NRFs 441-446 propagate the CHF status changes to one another over NRF 447. NRFs 441-446 serve out the CHF status changes to the network functions that have recently requested CHF information for that NF type. For example, CHF 455 may get a capacity boost, and in response, NRF 441 would notify SMSF 431, PCF 432, and SMF 434 that CHF 455 has increased available capacity. SMF 434 may select CHF 455 to serve UE 401 based on the increased capacity.

Figure 5:
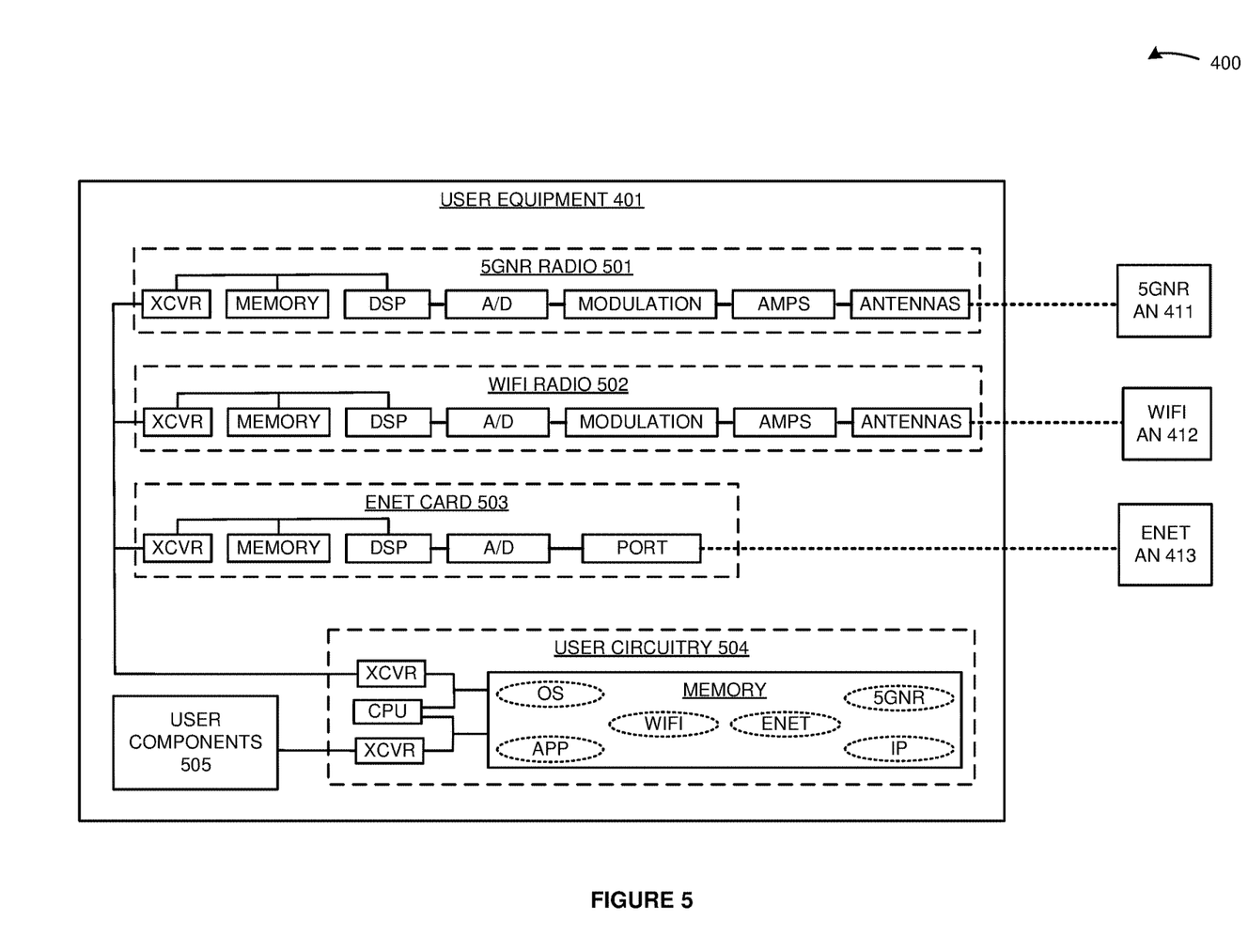
FIG. 5 illustrates an exemplary UE in the 5G wireless communication network.

FIG. 5 illustrates exemplary UE 401 in 5G wireless communication network 400. UE 401 comprises an example of the UEs in network 100, although those UEs may differ. UE 401 comprises 5GNR radio 501, WIFI radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, ENET, 5GNR, and IP. The antennas in 5GNR radio 501 are wirelessly coupled to 5GNR AN 411 over a 5GNR link. The antennas in WIFI radio 502 are wirelessly coupled to WIFI AN 412 over a WIFI link. The port in ENET card 503 is wireline coupled to ENET AN 413 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with ANs 411-413 over radios 501-502 and/or card 503. In some examples, some of the 5GNR, WIFI, and ENET components are omitted. For example, the 5GNR and ENET portions could be omitted to form a WIFI-only UE. The 5GNR and WIFI portions could be omitted to form an ENET-only UE. The WIFI and ENET portions could be omitted to form a 5GNR-only UE. Other device combinations could be used like 5GNR/WIFI, 5GNR/ENET, and WIFI/ENET.

Figure 6:
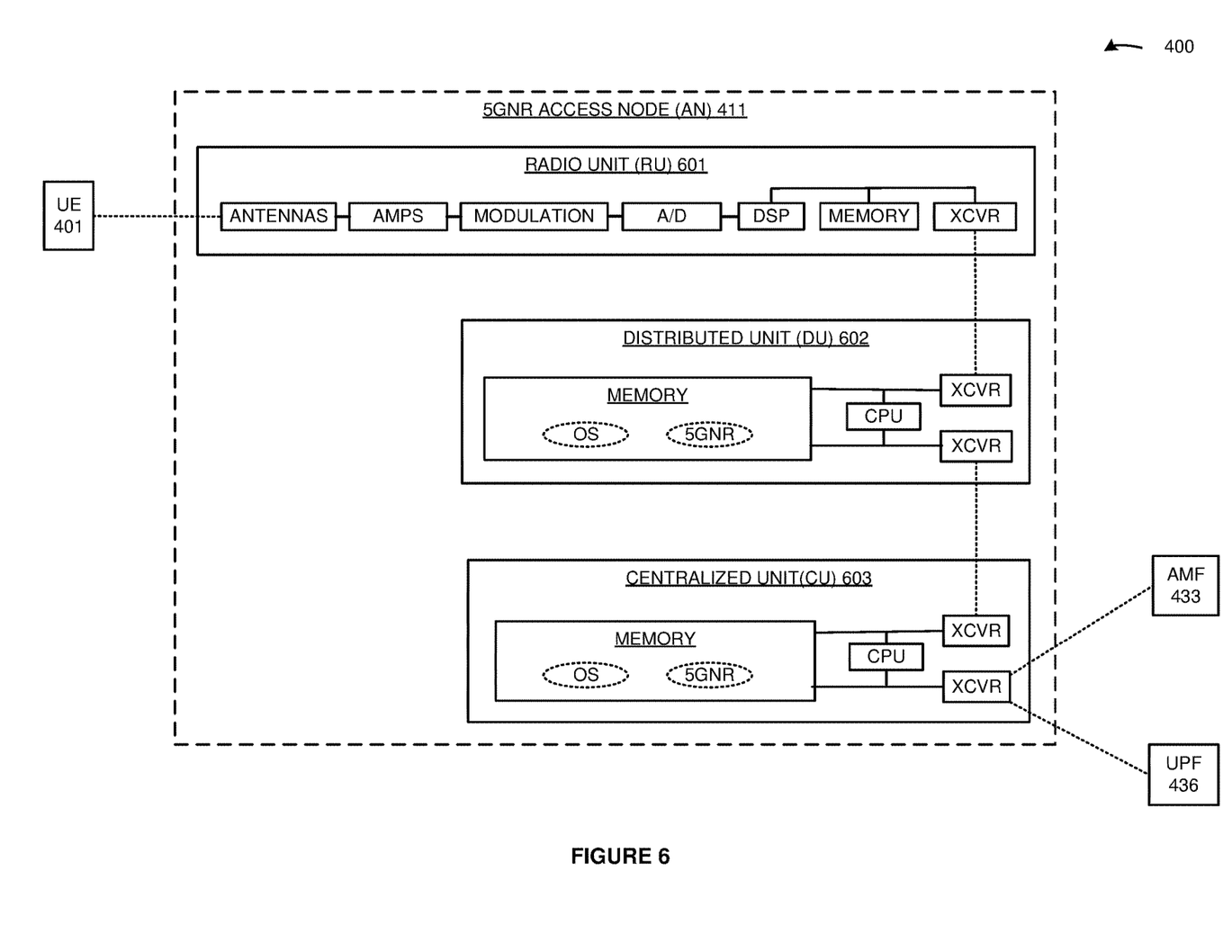
FIG. 6 illustrates an exemplary 5G New Radio (NR) access node in the 5G wireless communication network.

FIG. 6 illustrates exemplary 5G New Radio (NR) Access Node (AN) 411 in 5G wireless communication network 400. 5GNR AN 411 comprises an example of the wireless access nodes in network 100, although those access nodes may differ. 5GNR AN 411 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system and 5GNR network applications (Packet Data Convergence Protocol, Service Data Adaptation Protocol, Radio Resource Control). The antennas in RU 601 are wirelessly coupled to UE 401 over a 5GNR link. Transceivers in RU 601 are coupled to transceivers in DU 602. Transceivers in DU 602 are coupled to transceivers in CU 603. Transceivers in CU 603 are coupled to AMF 433 and UPF 436. The DSP and CPU in RU 601, DU 602, and CU 603 execute operating systems, radio applications, and 5GNR applications to exchange network signaling and user data with UE 401, AMF 433, and UPF 436.

Figure 7:
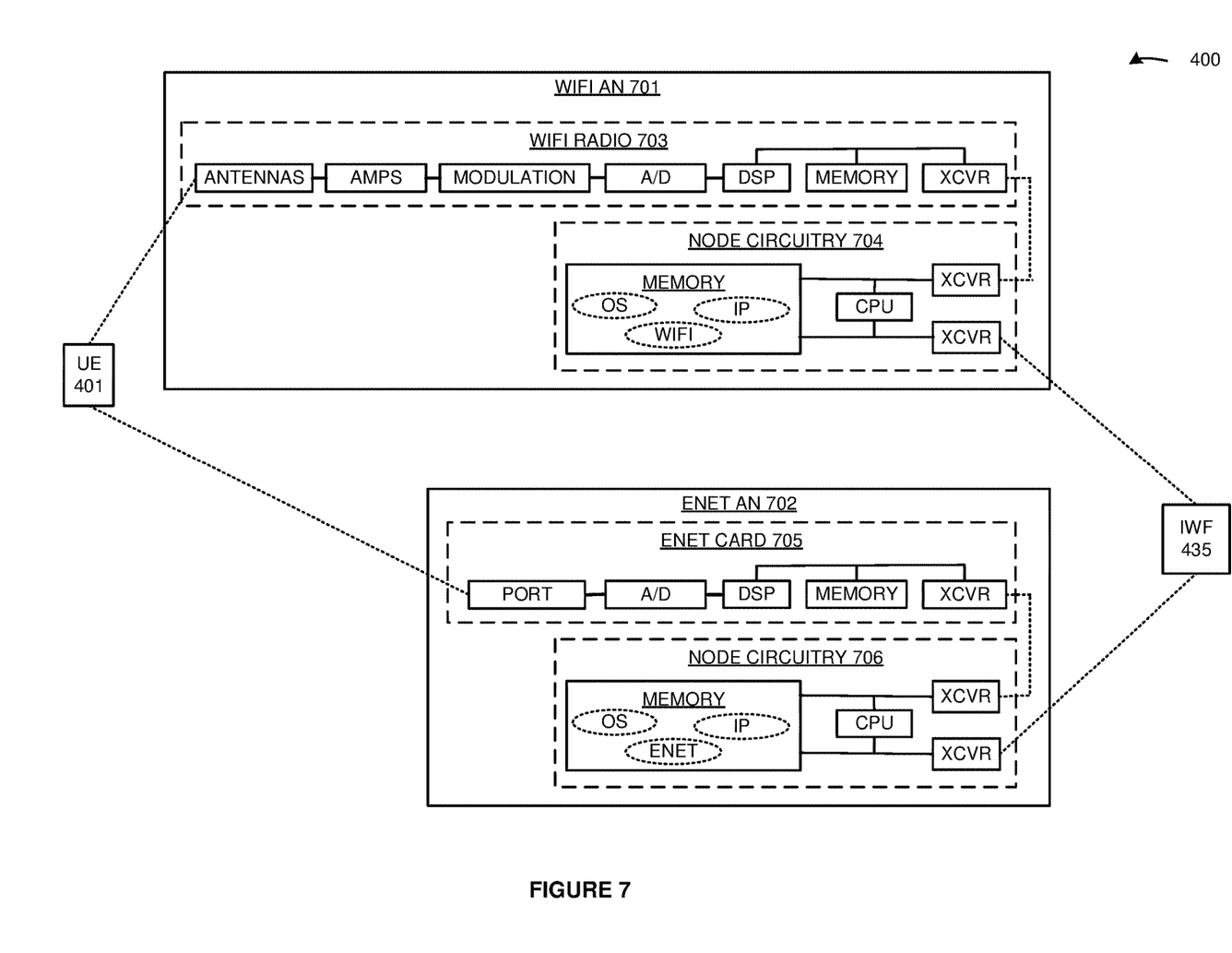
FIG. 7 illustrates exemplary wireless fidelity access node and ethernet access node in the 5G wireless communication network.

FIG. 7 illustrates exemplary WIFI Access Node (AN) 412 and ENET AN 413 in 5G in wireless communication network 400. WIFI AN 412 comprises WIFI radio 703 and node circuitry 704. WIFI radio 703 comprises antennas, amplifiers, filters, modulation, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for IP and WIFI. The antennas in WIFI radio 704 are wirelessly coupled to UE 401 over a WIFI link. Transceivers in WIFI radio 703 are coupled to transceivers in node circuitry 704. Transceivers in node circuitry 704 are coupled to transceivers in IWF 435. The CPU in node circuitry 704 executes the operating system and network applications to exchange network signaling and user data with UE 401 and with IWF 435.

ENET AN 702 comprises ENET card 705 and node circuitry 706. ENET card 705 comprises ports, analog-to-digital interfaces, DSP, memory, and transceivers that are coupled over bus circuitry. Node circuitry 706 comprises memory, CPU, user interfaces and components, and transceivers that are coupled over bus circuitry. The memory in node circuitry 706 stores an operating system and network applications for IP and ENET. The ports in ENET card 705 are wireline coupled to UE 401 over an ENET link. Transceivers in ENET card 705 are coupled to transceivers in node circuitry 706. Transceivers in node circuitry 706 are coupled to transceivers in IWF 435. The CPU in node circuitry 706 executes the operating system and network applications to exchange network signaling and user data with UE 401 and with IWF 435.

Figure 8:
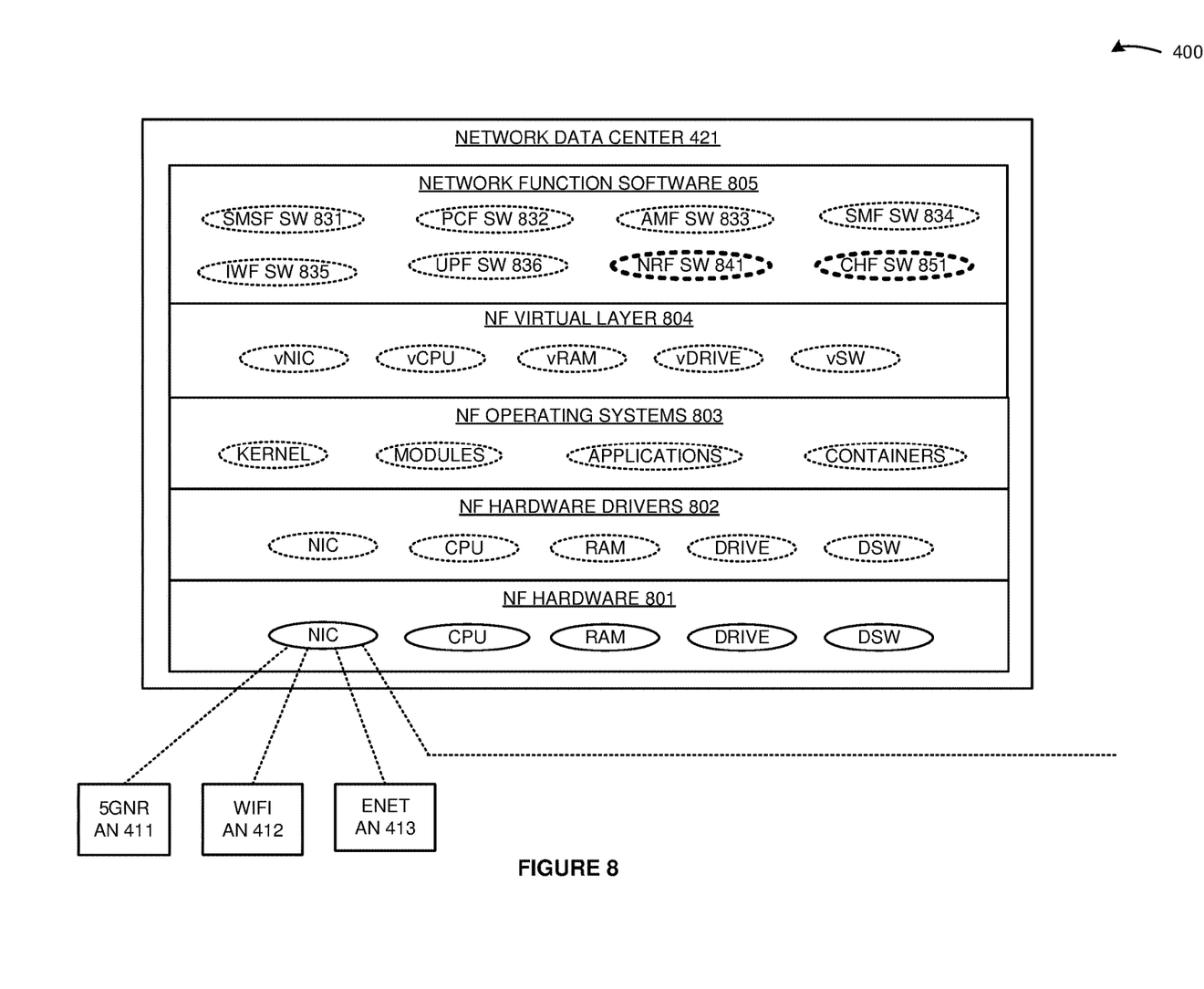
FIG. 8 illustrates an exemplary network data center in the 5G wireless communication network.

FIG. 8 illustrates exemplary network data center 421 in 5G wireless communication network 400. Network data center 421 comprises an example of network user plane 120 and network control plane 130, although planes 120 and 130 may differ. Network data center 421 also comprises an example of network control centers 422-427, although data centers 422-427 may differ. Network data center 422 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises SMSF SW 831, PCF SW 832, AMF SW 833, SMF SW 834, IWF SW 835, UPF SW 836, NRF SW 841, and CHF SW 851. Other NFs like Authentication Server Function (AUSF) and Network Exposure Function (NEF) are typically present but are omitted for clarity. Network data center 421 may be located at a single site or be distributed across multiple geographic locations. The NIC in NF hardware 801 are coupled to 5GNR AN 411, WIFI AN 412, ENET AN 413, and external systems. NF hardware 801 executes NF hardware drivers 802, NF operating systems 803, NF virtual layer 804, and NF SW 805 to form and operate SMSF 431, PCF 432, AMF 433, SMF 434, IWF 435, UPF 436, NRF 441, and CHF 451.

Figure 9:
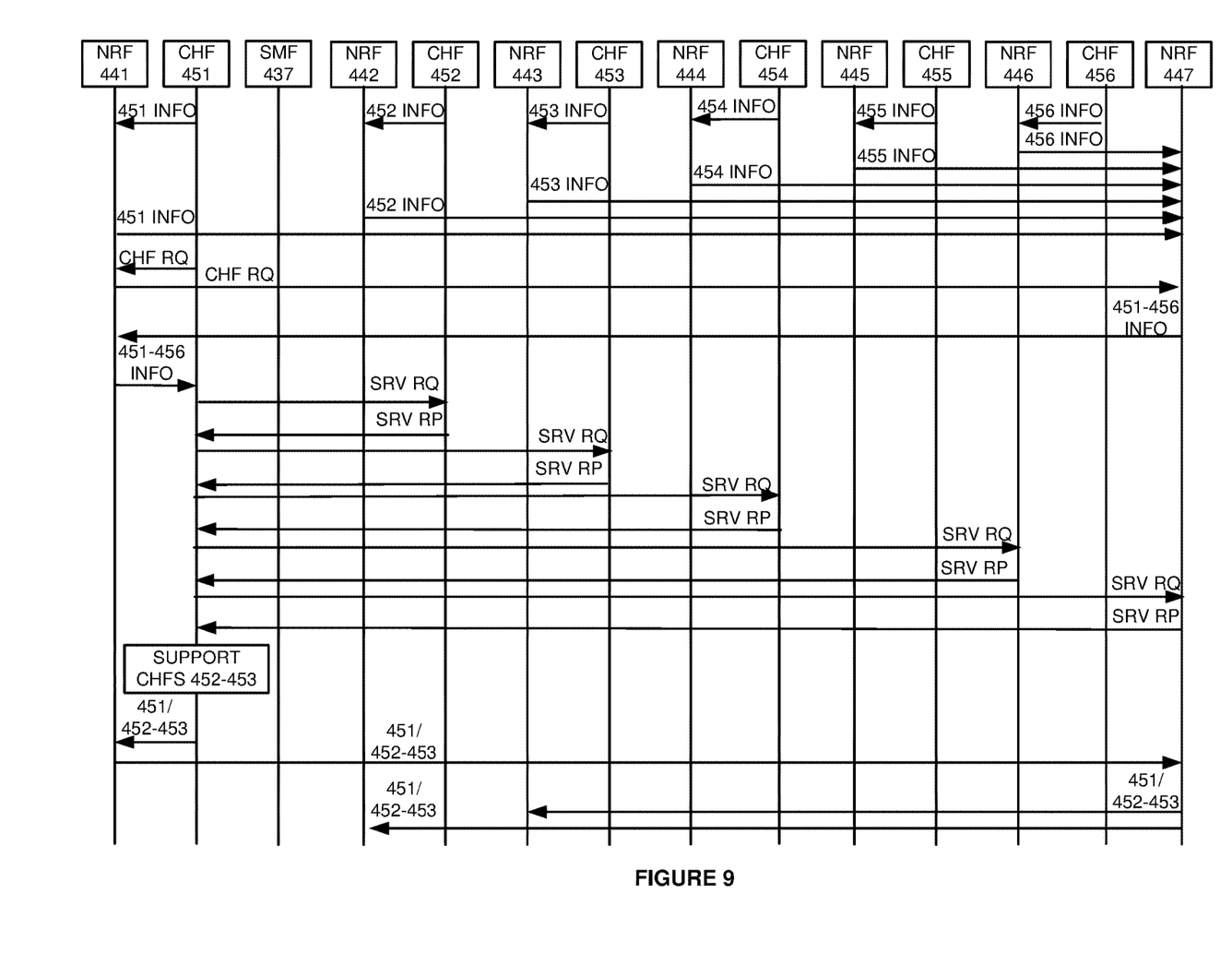
FIG. 9 illustrates an exemplary operation of the 5G wireless communication network to serve the wireless UEs over the Charging Functions (CHFs) that use the Network Repository Functions (NRFs).

FIG. 9 illustrates an exemplary operation of 5G wireless communication network 400 to serve wireless UE 401 over CHFs 451-456 using NRFs 441-447. The operation may differ in other examples. CHFs 451-456 determine CHF information like CHF ID and CHF status. The CHF status comprises IP address, geographic location, current load, available capacity, service priorities, NF alarms, and the like. CHFs 451-456 indicate their CHF information to respective NRFs 441-446 in their own network data centers 421-426. NRFs 441-446 forward the CHF information to NRF 447.

To support CHFs 452-456, CHF 451 requests CHF information from local NRF 441. In response to the CHF information request from a CHF, NRF 441 requests global CHF information from NRF 447, and NRF 447 responds to NRF 441 with the CHF information for CHFs 452-456. NRF 441 responds to CHF 451 with the CHF information for CHFs 452-456. CHF 451 exchanges service requests/responses (RQ/RP) with CHFs 452-456 based the IP addresses in the CHF information to determine individual response latency for CHFs 452-456. CHF 451 then selects nearby CHFs to support based on their latency. For example, CHF 451 may only support individual CHFs 452-456 that have a response latency that is less than one second. In this example, CHF 451 elects to support CHFs 452-453 but not CHFs 454-456. CHF 451 registers its support for CHFs 452-453 with local NRF 441. NRF 441 indicates the CHF support (451 supports 452-453) to NRF 447. NRF 441 indicates the CHF support to local NRFs 442-443 for selected CHFs 452-453. The discussion proceeds to FIG. 10.

Figure 10:
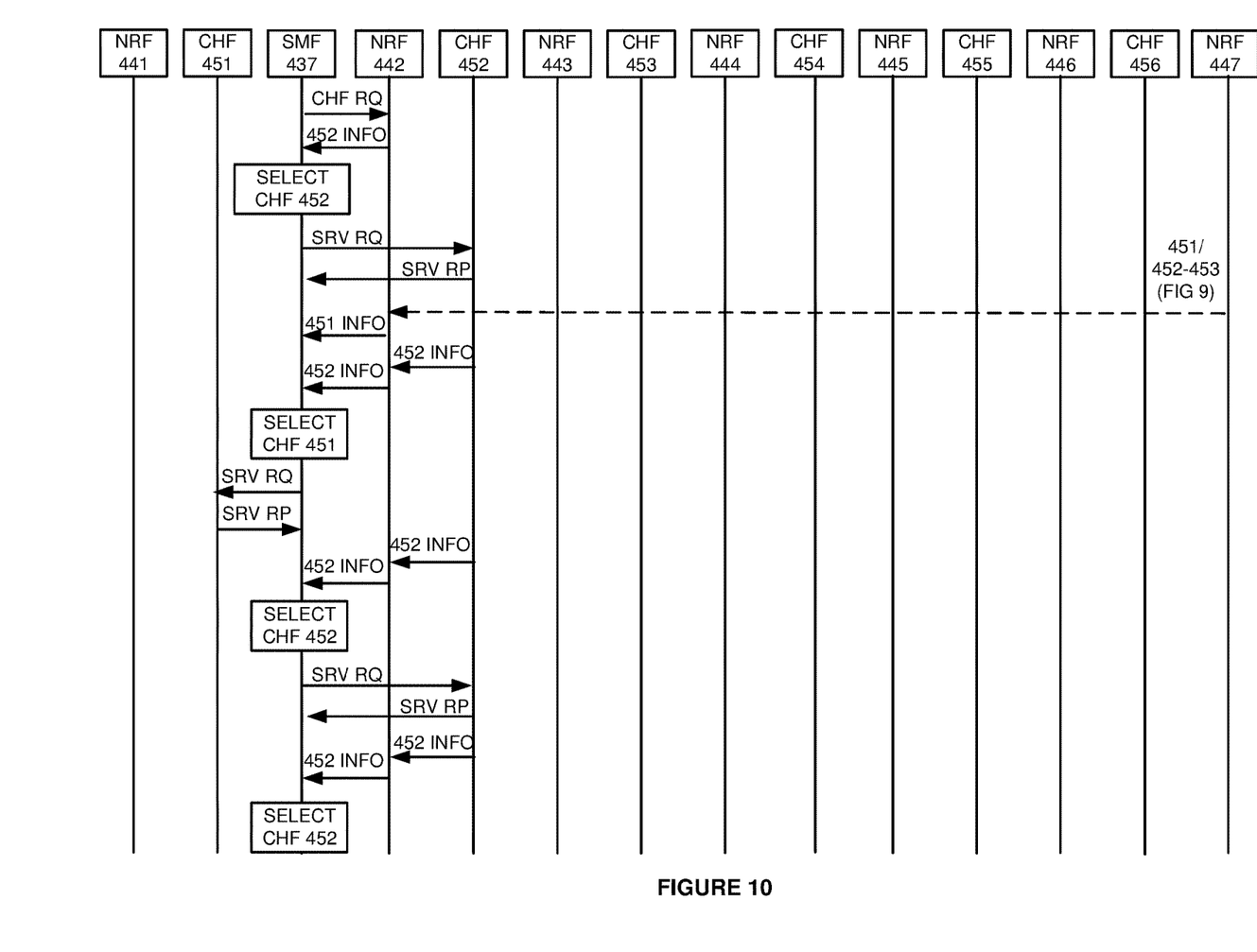
FIG. 10 illustrates an exemplary operation of the 5G wireless communication network to serve the wireless UEs over the CHFs that use the NRFs.

FIG. 10 illustrates an exemplary operation of 5G wireless communication network 400 to serve wireless UE 401 over CHFs 451-456 using NRFs 441-447. The operation may differ in other examples. SMF 437 requires a CHF to serve UE 401 and requests CHF information from local NRF 442. NRF 442 responds with the CHF ID and status for local CHF 452 since no other CHFs have yet registered to support CHF 452. SMF 437 selects CHF 452 to support UE 401 based on the CHF ID and status data. SMF 437 and selected CHF 452 exchange service requests and service responses to serve wireless UE 401. For example, CHF 452 may transfer network usage credits for UE 401 to SMF 437, and SMF 437 may transfer network usage data for UE 401 to CHF 452.

At this time and described above for FIG. 9, NRF 442 receives the CHF support indication from NRF 447 which indicates that CHF 451 supports CHFs 452-453. NRF 442 transfers the new CHF information to SMF 437 in response to the prior CHF information request from SMF 437. In addition, CHF 452 determines new status data like excessive load and transfers the new status data to its local NRF 442. NRF 442 transfers the excessive load status for CHF 452 to SMF 437 in response to the prior CHF information request from SMF 437. Although not shown for clarity, NRF 442 propagates the CHF 452 status change over NRFs 441-447. In response to the CHF 451 support and the excessive CHF 452 load, SMF 437 selects CHF 451 to serve UE 401. SMF 437 and selected CHF 451 now exchange service requests and service responses to serve wireless UE 401. For example, CHF 451 may transfer network usage credits for UE 401 to SMF 437, and SMF 437 may transfer network usage data for UE 401 to CHF 451.

CHF 452 again determines new status data like reduced load and transfers the new status data to local NRF 442. NRF 442 transfers the reduced load status for CHF 452 to SMF 437 in response to the prior CHF information request from SMF 437. Although not shown for clarity, NRF 442 propagates the CHF 452 status change to CHFs 451-456 over NRFs 441-447. In response to the reduced load on local CHF 452, SMF 437 reselects CHF 452 to serve UE 401. The operation continues as described above with an exchange of service requests and responses between SMF 437 and CHF 452.

The wireless data network circuitry described above comprises computer hardware and software that form special-purpose networking circuitry to serve wireless UEs over producer NFs and consumer NFs that use NRFs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve wireless UEs over producer NFs and consumer NFs that use NRFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve wireless User Equipment (UEs) over producer Network Functions (NFs) and a consumer NF that use a Network Repository Function (NRF), the method comprising:
   - the producer NFs determining their NF identities and their NF status;
   - the producer NFs exchanging test data with each other based on the NF identities, determining latencies for the NF identities, and selecting other ones of the producer NFs to support based on the latencies;
   - the producer NFs indicating the NF identities and the NF status to the NRF and registering with the NRF to support the other ones of the producer NFs;
   - the NRF receiving the NF indications of the NF identities the NF status, and the registrations to support the other ones of the producer NFs;
   - the consumer NF requesting NF information from the NRF;
   - the NRF receiving the NF information request and responsively indicating the NF identities, supporting NF identities registered to support the NF identities, and the NF status to the consumer NF;
   - the consumer NF receiving the NRF indications of the NF identities, the supporting NF identities, and the NF status, selecting one of the NF identities based on the NF status, and exchanging network signaling with one of the producer NFs based on the selected one of the NF identities to serve the wireless UEs;
   - the one of the producer NFs determining a new NF status and transferring the new NF status to the NRF;
   - the NRF receiving the new NF status, determining that the consumer NF requested NF information, and indicating the new NF status to the consumer NF responsive to the request from the consumer NF; and
   - the consumer NF selecting one of the supporting NF identities based on the new NF status.

2. The method of claim 1 wherein the producer NFs comprise Charging Functions (CHFs) and the consumer NF comprises at least one of a Session Management Function (SMF), Policy Control Function (PCF), and Short Message Service Function (SMSF).

3. The method of claim 1 wherein:
   - the consumer NF requesting NF information from the NRF comprises the consumer NF requesting the NF information for an NF type; and
   - the NRF receiving the NF information request and responsively indicating the NF identities and the NF status to the consumer NF comprises the NFR identifying the NF type and responsively indicating NF identities and NF status for the NF type to the consumer NF.

4. The method of claim 1 further comprising:
   - the producer NFs determining geographic location data for each other based on the NF identities; and wherein:
   - the producer NFs selecting the other ones of the producer NFs to support comprises the producer NFs selecting the other ones of the producer NFs to support based on the latencies and the geographic location data.

5. The method of claim 1 wherein:
   - the producer NFs determining their NF status comprises determining their Internet Protocol (IP) addresses;
   - the producer NFs indicating their NF status to the NRF comprises indicating the IP addresses;
   - the NRF receiving the indications of the NF status comprises receiving the indications of the IP addresses;
   - the NRF indicating the NF status to the consumer NF comprises indicating the IP addresses to the consumer NF; and the consumer NF receiving the indications of the NF status and selecting the one of the NF identities based on the NF status comprises receiving the indications of the IP addresses and selecting the one of the NF identities based on the IP addresses.

6. The method of claim 1 wherein:

the producer NFs determining their NF status comprises determining their geographic locations;

the producer NFs indicating their NF status to the NRF comprises indicating the geographic locations;

the NRF receiving the indications of the NF status comprises receiving the indications of the geographic locations;

the NRF indicating the NF status to the consumer NF comprises indicating the geographic locations to the consumer NF; and the consumer NF receiving the indications of the NF status and selecting the one of the NF identities based on the NF status comprises receiving the indications of the geographic locations and selecting the one of the NF identities based on the geographic locations.

7. The method of claim 1 wherein:

the producer NFs determining their NF status comprises determining their available capacities;

the producer NFs indicating their NF status to the NRF comprises indicating the available capacities;

the NRF receiving the indications of the NF status comprises receiving the indications of the available capacities;

the NRF indicating the NF status to the consumer NF comprises indicating the available capacities to the consumer NF; and the consumer NF receiving the indications of the NF status and selecting the one of the NF identities based on the NF status comprises receiving the indications of the available capacities and selecting the one of the NF identities based on the available capacities.

8. The method of claim 1 wherein:

the producer NFs determining their NF status comprises determining their current loads;

the producer NFs indicating their NF status to the NRF comprises indicating the current loads;

the NRF receiving the indications of the NF status comprises receiving the indications of the current loads;

the NRF indicating the NF status to the consumer NF comprises indicating the current loads to the consumer NF; and the consumer NF receiving the indications of the NF status and selecting the one of the NF identities based on the NF status comprises receiving the indications of the current loads and selecting the one of the NF identities based on the current loads.

9. The method of claim 1 wherein:

the producer NFs determining their NF status comprises determining their service priorities;

the producer NFs indicating their NF status to the NRF comprises indicating the service priorities;

the NRF receiving the indications of the NF status comprises receiving the indications of the service priorities;

the NRF indicating the NF status to the consumer NF comprises indicating the service priorities to the consumer NF; and the consumer NF receiving the indications of the NF status and selecting the one of the NF identities based on the NF status comprises receiving the indications of the service priorities and selecting the one of the NF identities based on the service priorities.

10. The method of claim 1 wherein:

the one of the producer NFs determining the new NF status and transferring the new NF status to the NRF comprises the one of the producer NFs determining an overload condition and indicating the overload condition to the NRF;

the NRF receiving the new NF status and indicating the new NF status to the consumer NF comprises the NRF receiving the overload condition and indicating the overload condition to the consumer NF responsive to the request from the consumer NF; and the consumer NF selecting the one of the supporting NF identities comprises the consumer NF selecting the one of the supporting NF identities based on the overload condition.

11. A wireless communication network to serve wireless User Equipment (UEs) over producer Network Functions (NFs) and a consumer NF that use a Network Repository Function (NRF), the wireless communication network comprising:

the producer NFs configured to determine their NF identities and their NF status;

the producer NFs configured to exchange test data with each other based on the NF identities, determine latencies for the NF identities, and select other ones of the producer NFs to support based on the latencies;

the producer NFs configured to indicate the NF identities and the NF status to the NRF and register with the NRF to support the other ones of the producer NFs;

the NRF configured to receive the NF indications of the NF identities the NF status, and the registrations to support the other ones of the producer NFs;

the consumer NF configured to request NF information from the NRF;

the NRF configured to receive the NF information request and responsively indicate the NF identities, supporting NF identities registered to support the NF identities, and the NF status to the consumer NF;

the consumer NF configured to receive the NRF indications of the NF identities, the supporting NF identities, and the NF status, select one of the NF identities based on the NF status, and exchange network signaling with one of the producer NFs based on the selected one of the NF identities to serve the wireless UEs;

the one of the producer NFs configured to determine a new NF status and transfer the new NF status to the NRF;

the NRF configured to receive the new NF status, determine that the consumer NF requested NF information, and indicate the new NF status to the consumer NF responsive to the request from the consumer NF; and the consumer NF configured to select one of the supporting NF identities based on the new NF status.

12. The wireless communication network of claim 11 wherein the producer NFs comprise Charging Functions (CHFs) and the consumer NF comprises at least one of a Session Management Function (SMF), Policy Control Function (PCF), and Short Message Service Function (SMSF).

13. The wireless communication network of claim 11 wherein:

the consumer NF is configured to request the NF information from for an NF type; and the NRF is configured to identify the NF type and responsively indicate NF identities and NF status for the NF type to the consumer NF.

14. The wireless communication network of claim 11 further comprising:

the producer NFs configured to determine geographic location data for each other based on the NF identities; and wherein:

the producer NFs are configured to select the other ones of the producer NFs to support based on the latencies and the geographic location data.

15. The wireless communication network of claim 11 wherein:

the producer NFs are configured to determine their Internet Protocol (IP) addresses to determine their NF status;

the producer NFs are configured to indicate the IP addresses to indicate their NF status to the NRF;

the NRF is configured to receive the indications of the IP addresses to receive the indications of the NF status;

the NRF is configured to indicate the IP addresses to the consumer NF to indicate the NF status to the consumer NF; and the consumer NF is configured to receive the indications of the IP addresses and select the one of the NF identities based on the IP addresses to receive the indications of the NF status and select the one of the NF identities based on the NF status.

16. The wireless communication network of claim 11 wherein:

the producer NFs are configured to determine their geographic locations to determine their NF status;

the producer NFs are configured to indicate the geographic locations to indicate their NF status to the NRF;

the NRF is configured to receive the indications of the geographic locations to receive the indications of the NF status;

the NRF is configured to indicate the geographic locations to the consumer NF to indicate the NF status to the consumer NF; and the consumer NF is configured to receive the indications of the geographic locations and select the one of the NF identities based on the geographic locations to receive the indications of the NF status and select the one of the NF identities based on the NF status.

17. The wireless communication network of claim 11 wherein:

the producer NFs are configured to determine their available capacities to determine their NF status;

the producer NFs are configured to indicate the available capacities to indicate their NF status to the NRF;

the NRF is configured to receive the indications of the available capacities to receive the indications of the NF status;

the NRF is configured to indicate the available capacities to the consumer NF to indicate the NF status to the consumer NF; and the consumer NF is configured to receive the indications of the available capacities and select the one of the NF identities based on the available capacities to receive the indications of the NF status and select the one of the NF identities based on the NF status.

18. The wireless communication network of claim 11 wherein:

the producer NFs are configured to determine their current loads to determine their NF status;

the producer NFs are configured to indicate the current loads to indicate their NF status to the NRF;

the NRF is configured to receive the indications of the current loads to receive the indications of the NF status;

the NRF is configured to indicate the current loads to the consumer NF to indicate the NF status to the consumer NF; and the consumer NF is configured to receive the indications of the current loads and select the one of the NF identities based on the current loads to receive the indications of the NF status and select the one of the NF identities based on the NF status.

19. The wireless communication network of claim 11 wherein:

the producer NFs are configured to determine their service priorities to determine their NF status;

the producer NFs are configured to indicate the service priorities to indicate their NF status to the NRF;

the NRF is configured to receive the indications of the service priorities to receive the indications of the NF status;

the NRF is configured to indicate the service priorities to the consumer NF to indicate the NF status to the consumer NF; and the consumer NF is configured to receive the indications of the service priorities and select the one of the NF identities based on the service priorities to receive the indications of the NF status and select the one of the NF identities based on the NF status.

20. The wireless communication network of claim 11 wherein:

the one of the producer NFs is configured to determine an overload condition and indicate the overload condition to the NRF;

the NRF is configured to receive the overload condition and indicate the overload condition to the consumer NF responsive to the request from the consumer NF; and the consumer NF is configured to select the one of the supporting NF identities based on the overload condition.

21. A wireless communication network to serve wireless User Equipment (UEs) over Charging Functions (CHFs) and a consumer NF that use a Network Repository Function (NRF), the wireless communication network comprising:

the CHFs configured to determine their NF identities and their NF status;

the CHFs configured to exchange test data with each other based on the NF identities, determine latencies for the NF identities, and select other ones of the CHFs to support based on the latencies;

the CHFs configured to indicate the NF identities and the NF status to the NRF and register with the NRF to support the other ones of the CHFs;

the NRF configured to receive the NF indications of the NF identities, the NF status, and the registrations to support the other ones of the CHFs;

the consumer NF configured to request NF information from the NRF, wherein the consumer NF comprises at least one of a Session Management Function (SMF), Policy Control Function (PCF), and Short Message Service Function (SMSF);

the NRF configured to receive the NF information request and responsively indicate the NF identities, supporting NF identities registered to support the NF identities, and the NF status to the consumer NF;

the consumer NF configured to receive the NRF indications of the NF identities, the supporting NF identities, and the NF status, select one of the NF identities based on the NF status, and exchange network signaling with one of the CHFs based on the selected one of the NF identities to serve the wireless UEs;

the one of the CHFs configured to determine a new NF status and transfer the new NF status to the NRF;
the NRF configured to receive the new NF status, determine that the consumer NF requested NF information, and indicate the new NF status to the consumer NF responsive to the request from the consumer NF; and
the consumer NF configured to select one of the supporting NF identities based on the new NF status.

\* \* \* \* \*